A. J. PARK.
WATER HEATER.
APPLICATION FILED AUG. 7, 1919.
1,372,447.
Patented Mar. 22, 1921.
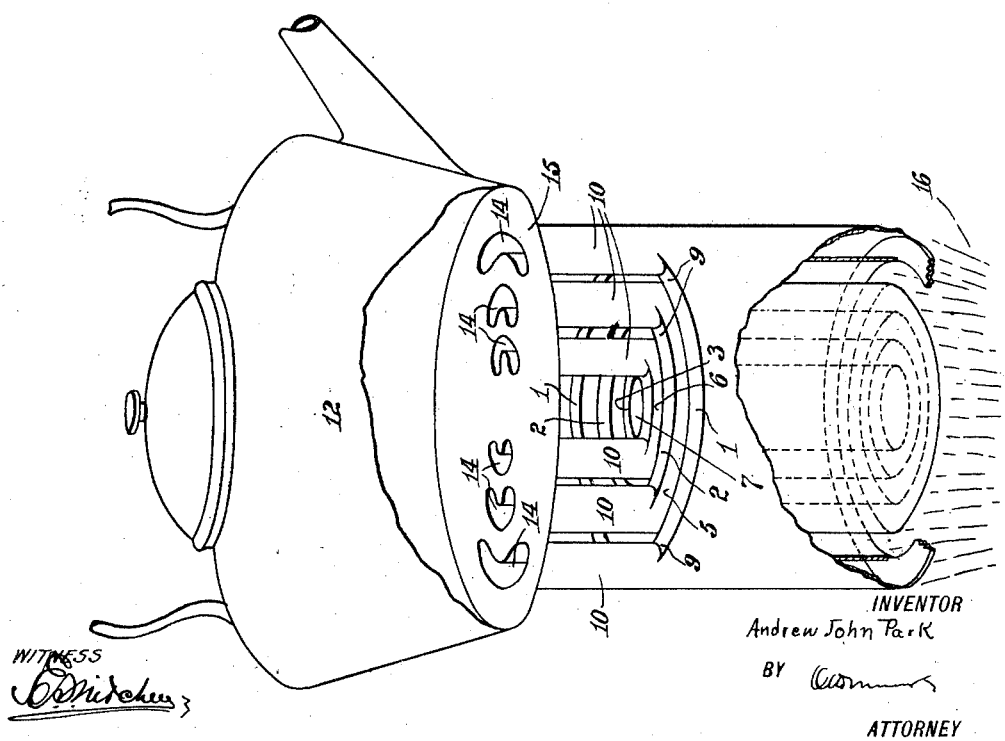
INVENTOR
Andrew John Park
BY
ATTORNEY

UNITED STATES PATENT OFFICE.

ANDREW JOHN PARK, OF WELLINGTON, NEW ZEALAND.

WATER-HEATER.

1,372,447.   Specification of Letters Patent.   Patented Mar. 22, 1921.

Application filed August 7, 1919. Serial No. 315,825.

*To all whom it may concern:*

Be it known that I, ANDREW JOHN PARK, solicitor, subject of the British Empire, residing at 31 Upland road, city of Wellington, Dominion of New Zealand, have invented certain new and useful Improvements in Water-Heaters, of which the following is a specification.

This invention relates to tea kettles used to boil water for making tea and the like. The object of the invention is to provide a tea kettle that is readily and easily used and which will boil water in considerably less time than usual with a consequent considerable saving of the heating medium. The leading feature of the invention is a quick water heating element which is attachable or attached by pipes to a kettle and preferably below said kettle. The invention is illustrated in the accompanying drawing showing a perspective view of the device.

The quick water heating element comprises a series of vertical or vertically inclined narrow water chambers 1, 2, 3, of any suitable shape in plan preferably circular and concentric and separated by flues 5, 6, and having a central flue 7.

A suitable form for the water chambers is a series of parallel oblong chambers preferably chords of a circle in plan.

The water chambers are closed at their upper and lower ends and the upper ends 9 are provided with pipes 10 which may be directly attached to the kettle 12 which has corresponding holes 14 in its bottom 15.

The vertical length of these chambers is preferably about twice the width of the chambers, the efficiency thereby being increased. Heat from a burner 16 is applied to the lower end of the water chambers.

It will be seen that no provision is specially made for circulation but it has been found in practice that none is required according to this invention.

I claim:—

1. In a water heater, the combination of a plurality of preheating water chambers and a manifold water chamber arranged above said preheating chambers, and separate means connecting each of said preheating water chambers with the manifold chamber whereby an independent circulating communication is established between the manifold water chamber and each of the preheating chambers.

2. In a water heater, the combination of a plurality of closed water chambers having defined heat flues entirely surrounding each chamber and a water chamber spaced above said closed chambers, pipes connecting each of said closed chambers with the upper chamber and adapted to establish a circulating current between each of said closed chambers and the upper chamber, there being a manifolding heat collecting flue formed by the space between the upper and closed water chambers and their connecting pipes.

3. In a water heater, the combination of a preheating water chamber comprising a plurality of nested concentric closed cells having defined heat passages entirely surrounding said cells and a water drum superposed above said preheating cells, circulating pipes connecting each of said cells to the upper water drum, and a transverse flue between said upper and lower water chambers and adapted to manifold the heat units rising through said heat passages.

4. In a water heater, the combination of a preheating chamber comprising graduated cylindrical cells concentrically arranged one within the other and provided with defined heat flues entirely surrounding each of said cells, a water chamber supported above said cells, a plurality of circulating tubes extending from the upper edge of each cell and adapted to communicate with the interior of said upper water chamber, and a space between the cells and the water chamber adapted to provide a manifold whereby the products of combustion are localized after passing through said flues surrounding the cells and concentrated upon the bottom of the water chamber.

In testimony whereof I have affixed my signature in presence of two witnesses.

ANDREW JOHN PARK.

Witnesses:
 VIOLET MARIES,
 ALAN EDWIN PARK.